(12) United States Patent
Yorita et al.

(10) Patent No.: US 10,663,037 B2
(45) Date of Patent: May 26, 2020

(54) HELICAL GEAR DEVICE

(71) Applicant: TOYOTA JIDOSHA KABUSHIKI KAISHA, Toyota-shi, Aichi (JP)

(72) Inventors: Hiroshi Yorita, Anjo (JP); Taketsugu Sasaki, Nagoya (JP); Kenichiro Tsukamoto, Nisshin (JP); Kazuya Arakawa, Toyota (JP); Manabu Hashimoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 236 days.

(21) Appl. No.: 15/996,984

(22) Filed: Jun. 4, 2018

(65) Prior Publication Data

US 2018/0347668 A1 Dec. 6, 2018

(30) Foreign Application Priority Data

Jun. 6, 2017 (JP) ................................ 2017-112015

(51) Int. Cl.
*F16H 1/28* (2006.01)
*F16H 55/17* (2006.01)
*F16H 1/20* (2006.01)

(52) U.S. Cl.
CPC .............. *F16H 1/28* (2013.01); *F16H 1/20* (2013.01); *F16H 55/17* (2013.01)

(58) Field of Classification Search
None
See application file for complete search history.

(56) References Cited

U.S. PATENT DOCUMENTS

| 3,081,648 A * | 3/1963 | Duer | F16H 55/06 475/345 |
| 3,983,764 A * | 10/1976 | Hicks | F16H 1/2836 74/410 |
| 7,585,248 B2 * | 9/2009 | Beneker | B60N 2/2251 475/195 |
| 10,344,825 B2 * | 7/2019 | Wigsten | F01L 1/352 |

FOREIGN PATENT DOCUMENTS

| JP | 2008-162352 A | 7/2008 |
| JP | 2014-013055 A | 1/2014 |

* cited by examiner

*Primary Examiner* — Dirk Wright
(74) *Attorney, Agent, or Firm* — Oliff PLC

(57) ABSTRACT

A helical gear device includes: first and second helical gear respectively and rotatably disposed about first and third mutually parallel axes; a second helical gear meshing with the first and third helical gears so that a rotary motion is transmitted from the first to the third helical gear through the second, the second helical gear having a center bore; a support shaft disposed coaxially with a second axis parallel to the first, and extending through the center bore with a predetermined amount of radial play between the support shaft and the second helical gear, rotatably supporting the second helical gear. The second and third helical gears have a predetermined radial clearance in their reference meshing state in which their pitch circles contact. The radial clearance is smaller than a radial gap of a backlash between the second and third helical gears in the reference meshing state.

5 Claims, 5 Drawing Sheets

HELICAL GEAR DEVICE

This application claims priority from Japanese Patent Application No. 2017-112015 filed on Jun. 6, 2017, the disclosure of which is herein incorporated by reference in its entirety.

FIELD OF THE INVENTION

The present invention relates in general to a helical gear device, and more particularly to techniques for improving durability and power transmitting efficiency of a helical gear device wherein three helical gears, namely, a first helical gear, a second helical gear and a third helical gear are connected in series to each other.

BACKGROUND OF THE INVENTION

There is known a helical gear device comprising a first helical gear disposed rotatably about a first axis; a third helical gear disposed rotatably about a third axis parallel to the first axis; a second helical gear meshing with the first helical gear and the third helical gear and having a center bore; and a support shaft extending through the center bore and disposed coaxially with a second axis parallel to the first axis, so as to support the second helical gear rotatably about the second axis, and wherein a rotary motion is transmitted from the first helical gear to the third helical gear through the second helical gear. JP-2014-13055A discloses an example of such helical gear device, in this helical gear device which is a planetary gear set 46, a second pinion gear 56 corresponds to the first helical gear, and a first pinion gear 52 corresponds to the second helical gear, while a sun gear 48 corresponds to the third helical gear. The second helical gear in the form of the first pinion gear 52 is supported freely rotatably by a support shaft in the form of a first pinion shaft 62 through a needle bearing 66.

However, the helical gear device described above suffers from a risk of concentric misalignment of the second helical gear due to a radial clearance (radial play) of the needle bearing, giving rise to generation of a mutual meshing interference between the second and third, helical gears with an amount of backlash therebetween being zeroed as a result of a movement of the second helical gear toward the third helical gear. The risk of generation of the mutual meshing interference increases with a decrease of a preset amount of the backlash to reduce generation of a mutual tooth butting noise of the second and third helical gears. The generation of the mutual meshing interference of the second helical gear with respect to the third helical gear causes not only considerable deterioration of efficiency of power transmission between the second and third helical gears, but also uneven load application to the second helical gear due to an axial component of a load of meshing with the first helical gear, giving rise to a risk of deterioration of durability of the helical gear device due to wearing of its various parts. Where a thrust washer having a small diameter is disposed axially adjacent to the second helical gear, for instance, the axial component of the load of meshing with the first helical gear is boosted (amplified) according to a difference of the diametric dimension of the thrust washer with respect to the second helical gear, giving rise to a risk of application of an excessively large thrust load to the thrust washer, and consequent early wearing and damaging of the thrust washer.

SUMMARY OF THE INVENTION

The present invention was made in view of the background art described above. It is therefore an object of the present invention to provide a helical gear device which has a reduced risk of deterioration of its power transmitting efficiency and durability due to mutual meshi interference between the second and third helical gears as a result of concentric misalignment of the second helical gear.

The object indicated above is achieved according to the following modes of the present invention:

According to a first mode of the invention, there is provided a helical gear device comprising: a first helical gear disposed rotatably about a first axis; a third helical gear disposed rotatably about a third axis parallel to the first axis; a second helical gear meshing with the first helical gear and the third helical gear so that a rotary motion is transmitted from the first helical gear to the third helical gear through the second helical gear, the second helical gear having a center bore; and a support shaft disposed coaxially with a second axis parallel to the first axis, and extending through the center bore with a predetermined amount of radial play between the support shaft and the second helical gear, so as to support the second helical gear rotatably about the second axis, and wherein the second helical gear and the third helical gear have a predetermined radial clearance in their reference meshing state in which a pitch circle of the second helical gear and a pitch circle of the third helical gear contact each other, the radial clearance being smaller than a radial gap of a backlash between the second and third helical gears in the reference meshing state.

The above-indicated radial clearance is a distance along a line of centers of the second and third helical gears (along a straight line connecting the second and third axes), between a top or peak of each tooth of one of the second and third helical gears and a bottom or root of each tooth of the other of the second and third helical gears. Generally, the radial clearance between the top of each tooth of the second helical gear and the bottom of each tooth of the third helical gear is equal to the radial clearance between the bottom of each tooth of the second helical gear and the top of each tooth of the third helical gear. Where the second and third helical gears have different whole tooth depths, these helical gears have different top (or bottom) clearance values. In this case, the radial clearance is interpreted to mean a smaller one of the top (bottom) clearance values. On the other hand, the above-indicated radial gap of the backlash in the reference meshing state is a distance by which the second and third helical gears are moved toward each other along their line of centers from the reference meshing state until the backlash is zeroed, and is equal to an amount of mutual overlapping of the pitch circles of the second and third helical gears.

According to a second mode of the invention, the helical gear device according to the first mode of the invention further comprises a rolling-contact bearing disposed between the support shaft and the center bore, and wherein the second helical gear is supported by the support shaft through the bearing, such that the second helical gear is rotatable about the second axis, with the radial play between the second helical gear and the support shaft.

According to a third mode of the invention, the helical gear device according to the first or second mode of the invention is configured such that the radial clearance is set so as to prevent generation of a meshing interference between the second and third helical gears with zeroing of a backlash therebetween, even in the event of zeroing of the radial clearance as a result of a relative movement of the second and third helical gears toward each other, and inclination of the second helical gear with respect to the second axis due to the radial play between the second helical gear and the support shaft.

According to a fourth mode of the invention, the helical gear device according to any one of the first through third modes of the invention is configured such that the first helical gear, the second helical gear and the third helical gear are external helical gears, and the first, second and third axes are positioned relative to each other such that a smaller-side angle defined by a first centerline connecting the first and second axes and a second centerline connecting the second and third axes, as seen in a direction of the first, second and third axes, is within a range between 60° and 150°, and the second centerline on which the third axis is positioned is located away from the first centerline by the smaller-side angle on a downstream side of rotation of the second helical gear.

The helical gear device according to the first mode of the invention is configured such that the radial clearance between the second and third helical gears in their reference meshing state is set to be smaller than the radial gap of the backlash in the reference meshing state, permitting prevention of the meshing interference between the second and third helical gears with the backlash being zeroed as a result of zeroing of the radial clearance, irrespective of the concentric misalignment of the second helical gear due to the radial play between the second helical gear and the support shaft. Thus, the present invention permits reduction of the backlash while preventing the meshing interference, and reduction of the risk of deterioration of the power transmitting efficiency of the helical gear device due to the meshing interference, and the risk of deterioration of the durability of the helical gear device due to wearing of its parts with uneven load application to the second helical gear due to the axial component of the load of meshing with the first helical gear.

According to the second mode of the invention, the rolling-contact bearing is disposed between the support shaft and the center bore of the second helical gear, such that the second helical gear has a predetermined amount of radial play with respect to the support shaft, in the presence of a radial clearance of the rolling-contact bearing with respect to the second helical gear. However, since the radial clearance between the second and third helical gears is smaller than the radial gap of the backlash, the risk of the meshing interference between the second and third helical gears is reduced, so that the deterioration of the power transmitting efficiency and durability of the helical gear device are reduced.

According to the third mode of the invention, the radial clearance is set so as to prevent the generation of the meshing interference between the second and third helical gears, even in the event of zeroing of the radial clearance and inclination of the second helical gear with respect to the second axis due to the radial play between the second helical gear and the support shaft. In this mode of the invention, it is possible to adequately prevent the meshing interference of the second helical gear with the third helical gear, and consequent deterioration of the power transmitting efficiency and durability of the helical gear device, even in the event of not only concentric misalignment of the second helical gear, but also its inclination with respect to the second axis.

According to the fourth mode of the invention, the first helical gear, the second helical gear and the third helical gear are external helical gears, and the first, second and third axes are positioned relative to each other such that the smaller-side angle defined by the first centerline connecting the first and second axes and the second centerline connecting the second and third axes, as seen in the direction of the first, second and third axes, is within the range between 60° and 150°. The second centerline on which the third axis is positioned is located away from the first centerline by the smaller-side angle on the downstream side of rotation of the second helical gear. Accordingly, a meshing load applied from the first helical gear to the second helical gear and a meshing reaction force applied from the third helical gear to the second helical gear cause the second helical gear to receive a concentric misalignment force which has a componet it causing the second helical gear to move toward the third helical gear. Although the concentric misalignment force acts to cause a movement of the second helical gear toward the third helical gear, and consequent concentric misalignment of the second helical gear, the radial clearance between the second and third helical gears is zeroed to prevent the meshing interference between the second and third helical gears, and reduce the risk of deterioration of the power transmitting efficiency and durability of the helical gear device.

DETAILED DESCRIPTION OF THE INVENTION

For example, the first helical gear is splined to an input shaft such that the first helical gear is rotated about the first axis together with the input shaft of the helical gear device, while the third helical gear is splined to an output shaft such that the third helical gear is rotated about the third axis together with the output shaft of the helical gear device.

However, the first helical gear may mesh with other helical gears to or from which a rotary motion is transmitted. For example, the second helical gear is supported by a support shaft through a rolling-contact bearing, freely rotatably about the second axis. However, the second helical gear may be supported by the support shaft in various other manners with a predetermined radial clearance with respect to the support shaft, for example, supported through a plain bearing such as a bearing metal, or splined to the support shaft such that the second helical gear is rotated about the second axis together with the support shaft. The rolling-contact bearing may be a ball bearing, as well as a needle bearing or a roller bearing, for instance.

The radial clearance between the second and third helical gears is preferably set to prevent generation of a meshing interference between the second and third helical gears with zeroing of a backlash therebetween, even in the event of inclination of the second helical gear with respect to the second axis with the radial clearance being zeroed. However, the amount of the radial clearance may be set to be smaller than the radial gap of the backlash between the second and third helical gears, in at least the reference meshing state in which the second helical gear is parallel to the second axis. Where the first, second and third helical gears are external helical gears, the first, second and third axes are preferably positioned relative to each other such that the smaller-side angle defined by the first centerline connecting the first and second axes and the second centerline connecting the second and third axes, as seen in the direction of the first, second and third axes, is within a range between 60° and 150°. The second centerline on which the third axis is positioned is located away from the first centerline by the smaller-side angle on a downstream side of rotation of the second helical gear. Described more specifically, the concentric misalignment force acting on the second helical gear is relatively small where the above-indicated smaller-side angle is smaller than 60°, while the direction in which the concentric misalignment force acts considerably deviates from the direction toward the third axis where the smaller-side angle is larger than 150°. However, the present invention is equally applicable to a helical gear device in which the above-indicated smaller-side angle is outside the range between 60° and 150°, in which there is a risk of concentric misalignment of the second helical gear on the side nearer to the third helical gear. It is noted that as long as the third axis is located on the downstream side of rotation of the second helical gear, the rotational directions of the first to third helical gears are not limited to those in the embodiment.

The first helical gear, second helical gear and third helical gear are external helical gears, for instance. However, one of the first and third helical gears may be an internal helical gear. The first, second and third axes are positioned as needed by means of a housing of the helical gear device. Where the helical gear device is provided in a planetary gear set of a double-pinion type, for example, the first axis is an axis of a sun gear or a ring gear while the second and third axes are set in a carrier disposed rotatably about the first axis. Alternatively, it is possible that the third axis is an axis of the sun gear or ring gear, while the first and second axes are set in the carrier rotatable about the third axis.

DETAILED DESCRIPTION OF PREFERRED EMBODIMENT

A preferred embodiment of this invention will be described in detail by reference to the drawings. It is to be understood that the drawings are simplified and transformed as needed, and do not necessarily accurately represent dimensions and shapes of various elements of the embodiment.

Figure 1:
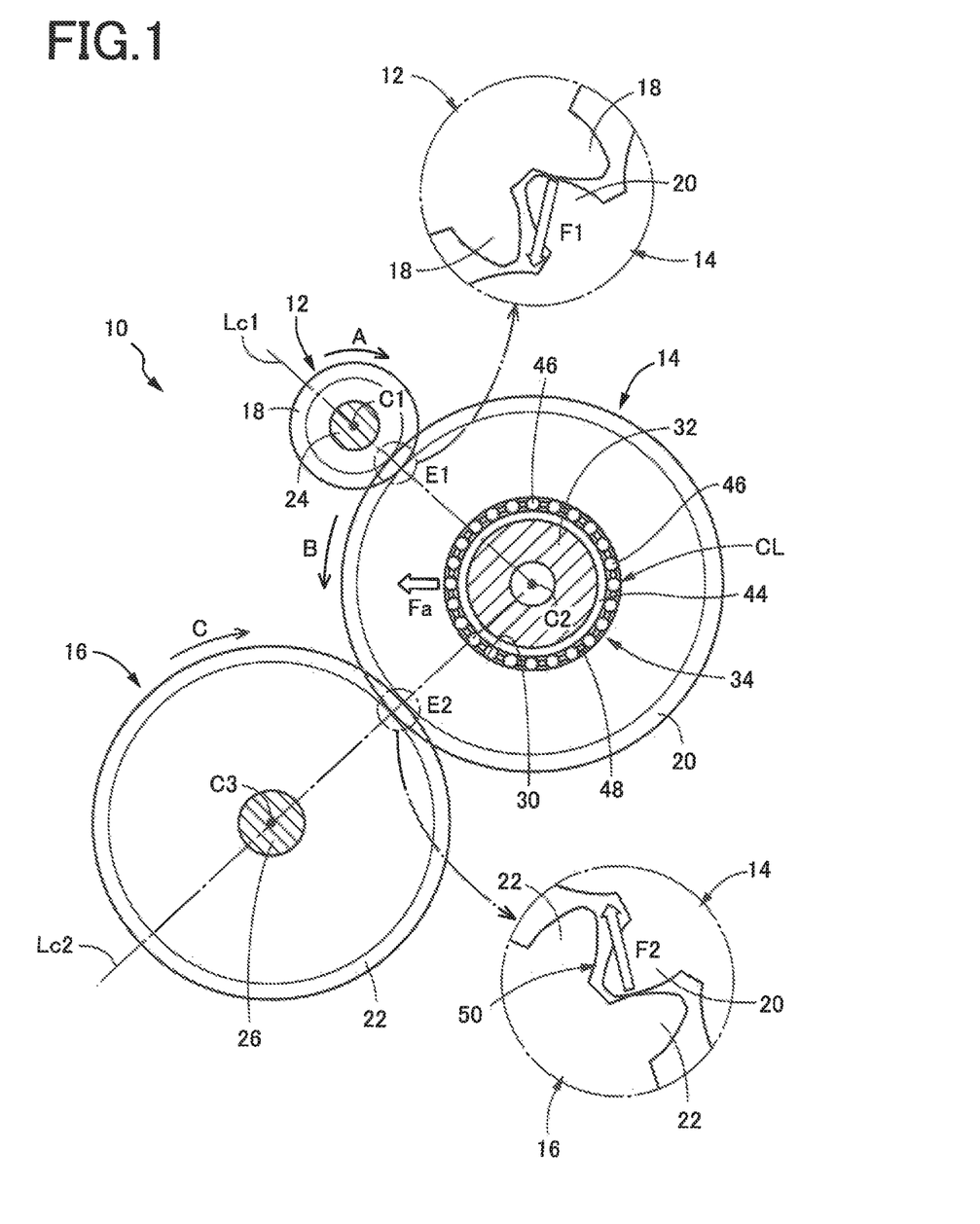
FIG. 1 is a schematic front elevational view of a helical gear device according to one embodiment of the present invention, with its tooth meshing portions E1 and E2 being shown in enlargement.

FIG. 1 is the schematic front elevational view of a helical gear device 10 according to one embodiment of this invention, with its tooth meshing portions E1 and E2 being shown in enlargement. This helical gear device 10, which is used in a vehicular power transmitting system, for example, includes a first helical gear 12 disposed rotatably about a first axis C1, a second helical gear 14 disposed rotatably about a second axis C2 parallel to the first axis C1, and a third helical gear 16 disposed rotatably about a third axis C3 parallel to the first axis C1. The second helical gear 14 is held in meshing engagement with both of the first and third helical gears 12 and 16. These helical gears 12, 14 and 16 are external helical gears having respective meshing teeth 18, 20 and 22 formed at their radially outer portions such that the meshing teeth 18, 20 and 22 are twisted obliquely with respect to the respective axes C1, C2 and C3. The meshing teeth 20 of the second helical gear 14 are held in meshing engagement with the meshing teeth 18 and 22 of the first and third helical gears 12 and 16, so that a rotary motion is transmitted between the first and third helical gears 12 and 16 through the second helical gear 14. The first, second and third axes C1, C2 and C3 are located at respective positions relative to each other, by a housing of the helical gear device 10. Where the helical gear device 10 is provided in a planetary gear set of a double-pinion type, the first axis C1 is an axis of a sun gear, while the second and third axes C2 and C3 are set by a carrier which is rotatable about the first axis C1, specifically, set to each axis of two pinion gears to which the carrier is connected. Namely the sun gear functions as the first helical gear 12, and a first pinion and a second pinion disposed on the carrier respectively function as the second and third helical gears 14 and 16.

The first helical gear 12 is splined or otherwise connected to an input shaft 24 disposed coaxially with the first axis C1, such that the first helical gear 12 is rotated together with the input shaft 24. An input rotary drive force is transmitted to the first helical gear 12 through the input shaft 24, so that the first helical gear 12 and the input shaft 24 are rotated as a unit about the first axis C1. The third helical gear 16 is splined or otherwise connected to an output shaft 26 disposed coaxially with the third axis C3, such that the third helical gear 16 is rotated together with the output shaft 26 about the third axis C3, so that the rotary drive force is transmitted from the output shaft 26. That is, a rotary motion transmitted to the first helical gear 12 through the input shaft 24 is transmitted through the second helical gear 14 to the third helical gear 16, namely, to the output shaft 26. When the first helical gear 12 is rotated clockwise as indicated by an arrow-headed line A, the second helical gear 14 is rotated counterclockwise as indicated by an arrow-headed line B, while the third helical gear 16 is rotated clockwise as indicated by an arrow-headed line C.

Figure 2:
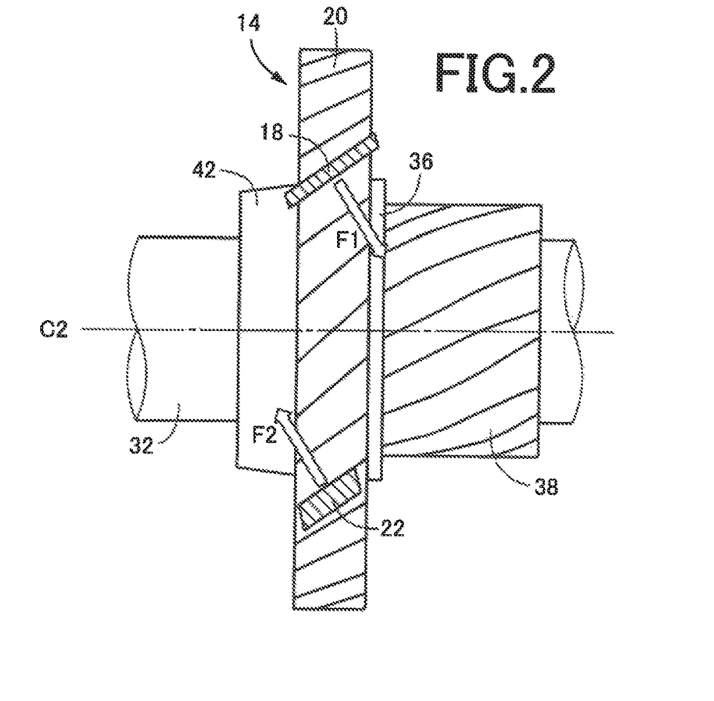
FIG. 2 is a side elevational view of a second helical gear of the helical gear device of FIG. 1, with teeth of a first helical gear and a third helical gear meshing with the second helical gear being shown in cross section.
Figure 3:
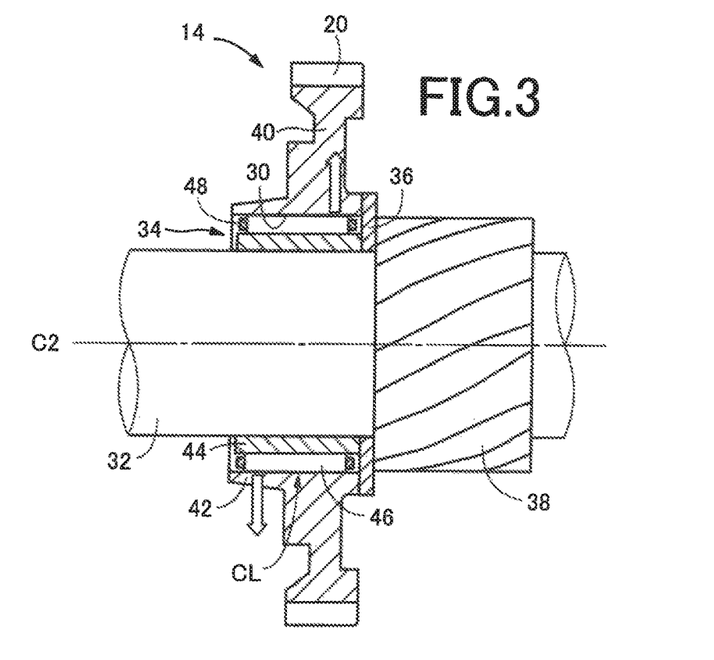
FIG. 3 is an axial cross sectional view of the second helical gear shown in FIG. 2.

The second helical gear 14 has a center bore 30 through which a support shaft 32 extends. The second helical gear 14 is supported by the support shaft 32 through a rolling-contact bearing 34 such that the second helical gear 14 is freely rotatable about the second axis C2 relative to the support shaft 32. Reference is now made to FIGS. 2 and 3. FIG. 2 is the side elevational view of the second helical gear 14, with the meshing teeth 18 and 22 of the first and third helical gears 12 and 16 being shown in cross section, and FIG. 3 is the axial cross sectional view of the second helical gear 14 shown in FIG. 2. As shown in FIGS. 2 and 3, a fourth helical gear 38 is fixedly mounted on the support shaft 32 such that the fourth helical gear 38 is disposed axially adjacent to the second helical gear 14. Between the second helical gear 14 and the fourth helical gear 38, there is interposed a thrust washer 36 which reduces a resistance to a relative rotary motion of the second and fourth helical gears 14 and 38. The fourth helical gear 38 has a smaller outside diameter than the second helical gear 14, and the thrust washer 36 has an outside diameter slightly larger than that of the fourth helical gear 38 and considerably smaller than that of the second helical gear 14.

The second helical gear 14 includes a disc portion 40 having the meshing teeth 20 at its radially outer portion, and a cylindrical portion 42 formed radially inwardly of and integrally with the disc portion 40 such that the disc portion 40 and the cylindrical portion 42 are coaxial with each other (with the second axis C2). The cylindrical portion 42 has an inner circumferential surface which defines the center bore 30 and cooperates with an outer circumferential surface of the support shaft 32 to define an annular space in which the rolling contact bearing 34 is disposed. The cylindrical portion 42 has an outside diameter almost equal to that of the thrust washer 36, and an inside diameter almost equal to an outside diameter of the fourth helical gear 38. The inside diameter of the cylindrical portion 42 is equal to a diameter of the center bore 30. The rolling-contact bearing 34 is provided with a cylindrical inner race 44, a plurality of rollers 46, and a holder 48. The inner race 44 is fitted on the support shaft 32. The rolling-contact bearing 34 is a needle bearing having the rollers 46 in the form of needles, for example, and has a predetermined amount of radial clearance (play) CL.

It is noted here that the first, second and third axes C1, C2 and C3 are positioned relative to each other such that a smaller-side angle (an angle around the second axis C2 and located left side of the second axis C2 in FIG. 1) defined by a first centerline Lc1 connecting the first and second axes C1 and C2 and a second centerline Lc2 connecting the second and third axes C2 and C3, as seen in the front elevational view of FIG. 1, namely, in the direction of the first, second and third axes C1, C2 and C3, is within a range between 60° and 150°, about 90° in this embodiment. The second centerline Lc2 on which the third axis C3 is positioned is located away from the first centerline Lc1 by the smaller-side angle along a rotation direction of the second helical gear 14 on a downstream side of rotation of the second helical gear 14. When a rotary drive force is transmitted from the first helical gear 12 to the third helical gear 16 through the second helical gear 14, a resistance to rotation of the third helical gear 16 causes a meshing load F1 applied from the first helical gear 12 to the second helical gear 14 in the tooth meshing portion E1 between the first and second helical gears 12 and 14, and a meshing reaction force F2 applied from the third helical gear 16 to the second helical gear 14 in the tooth meshing portion E2 between the second and third helical gears 14 and 16. These meshing load F1 and the meshing reaction force F2 cause the second helical gear 14 to receive a concentric misalignment force Fa which is a resultant of the meshing load F1 and meshing reaction force F2, so that the second helical gear 14 has a possibility of a movement toward the third helical gear 16, by a distance corresponding to the radial clearance of the rolling-contact bearing 34, on the basis of the concentric misalignment force Fa. It is noted that the meshing load F1 and the meshing reaction force F2 cause application of a clockwise moment (as seen in FIG. 2, to the second helical gear 14, but this clockwise moment is received by the rolling-contact bearing 34, with rolling performance of the bearing 34 being adequately maintained, so as to prevent a risk of application of an excessive thrust load to the thrust washer 36, with opposite axial thrust force components being offset by each other.

Figure 4:
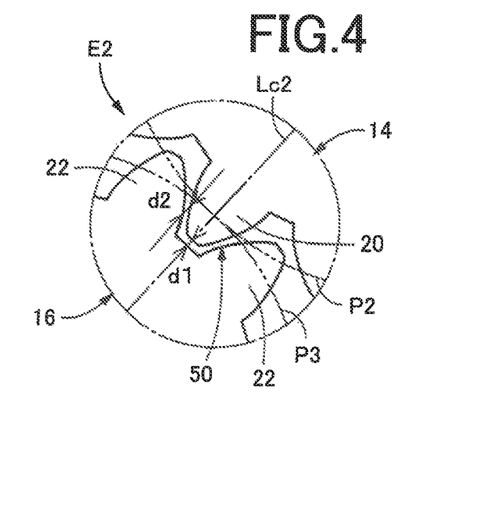
FIG. 4 is an enlarged view of the tooth meshing portion E1 between the second and third helical gears shown in FIG. 1, indicating a radial clearance d1 and a radial gap d2 of a backlash between those helical gears.
Figure 5:
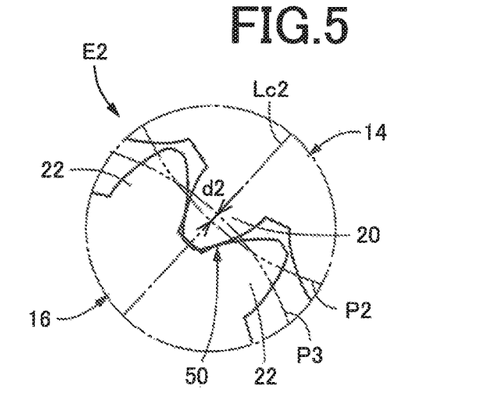
FIG. 5 is a view indicating a dimension in the radial gap d2 of the backlash of FIG. 4 using an overlapping amount between pitch circles P2 and P3 of the second and third helical gears.
Figure 6:
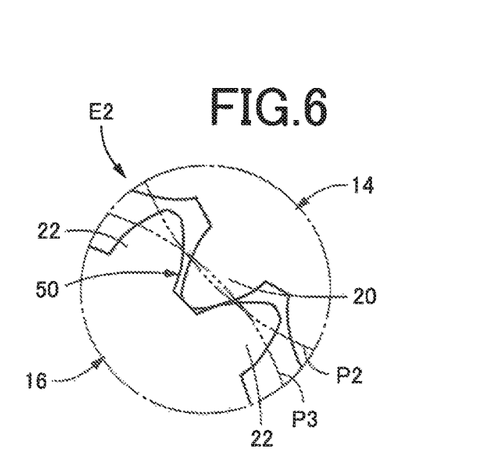
FIG. 6 is a view indicating that the radial clearance d1 of FIG. 4 between the second and third helical gears is zeroed during their rotary motions due to concentric misalignment of the second helical gear.

On the other hand, the tooth meshing portion E2 between the second and third helical gears 14 and 16 has a predetermined radial (top) clearance d1 in their reference meshing state in which a pitch circle P2 of the second helical gear 14 and a pitch circle P3 of the third helical gear 16 contact each other, as shown in FIG. 4. While the radial clearance d1 between the top or peak of each tooth of the second helical gear 14 and the bottom or root of each tooth of the third helical gear 16 is shown in FIG. 4, a radial clearance between the tooth bottom of the second helical gear 14 and the tooth top of the third helical gear 16 is the same as the radial clearance d1, since the teeth 20 of the second helical gear 14 and the teeth 22 of the third helical gear 16 have the same cross sectional shape. It is also noted that the radial clearance d1 is set to be smaller than a radial gap d2 of a backlash 50 between the second and third helical gears 14 and 16 in the reference meshing state. The radial gap d2 of the backlash 50 is a radial distance by which the second and third helical gears 14 and 16 are moved toward each other along e second centerline Lc2 from their positions in the reference meshing state of FIG. 4, until the backlash 50 is reduced to zero, as indicated in FIG. 5. This radial gap d2 is equal to an amount of mutual overlapping of the pitch circles P2 and P3. FIG. 5 shows the second and third helical gears 14 and 16 after their relative movement to each other until the backlash 50 is zeroed, on the assumption that there is no interference between the tooth top of the second helical gear 14 and the tooth bottom of the third helical gear 16. Since the radial clearance d1 is set to be smaller than the radial gap d2 of the backlash 50, the radial clearance d1 is zeroed before the backlash 50 is zeroed, as indicated in FIG. 6, as a result of the movement of the second helical gear 14 toward the third helical gear 16 with the concentric misalignment force Fa described above, so that a further movement of the second helical gear 14 toward the third helical gear 16 is inhibited to prevent the meshing interference between the second and third helical gears 14 and 16, that is, to prevent the zeroing of the backlash 50.

Figure 9:
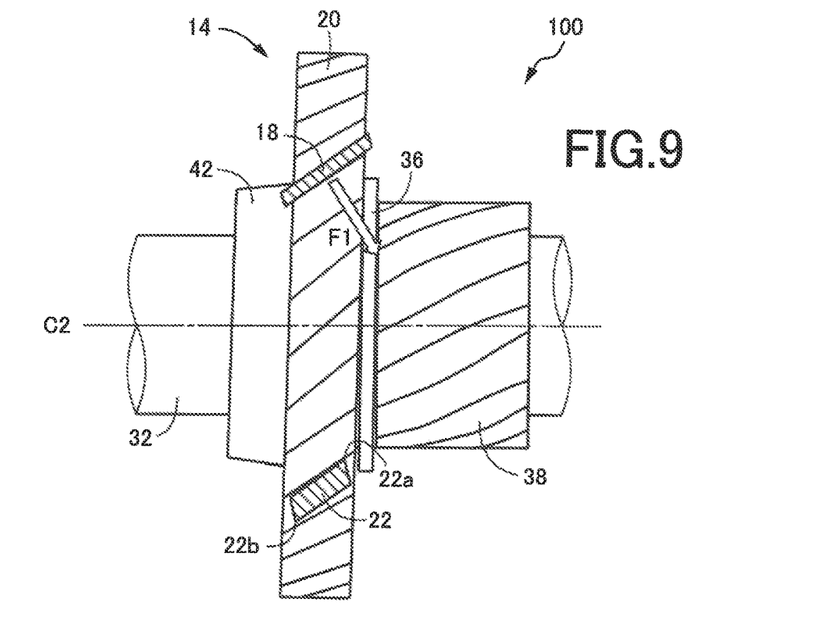
FIG. 9 is a view corresponding to that of FIG. 2, showing a second helical gear of a conventional helical gear device where the second helical gear has a mutual meshing interference with respect to a third helical gear.
Figure 10:
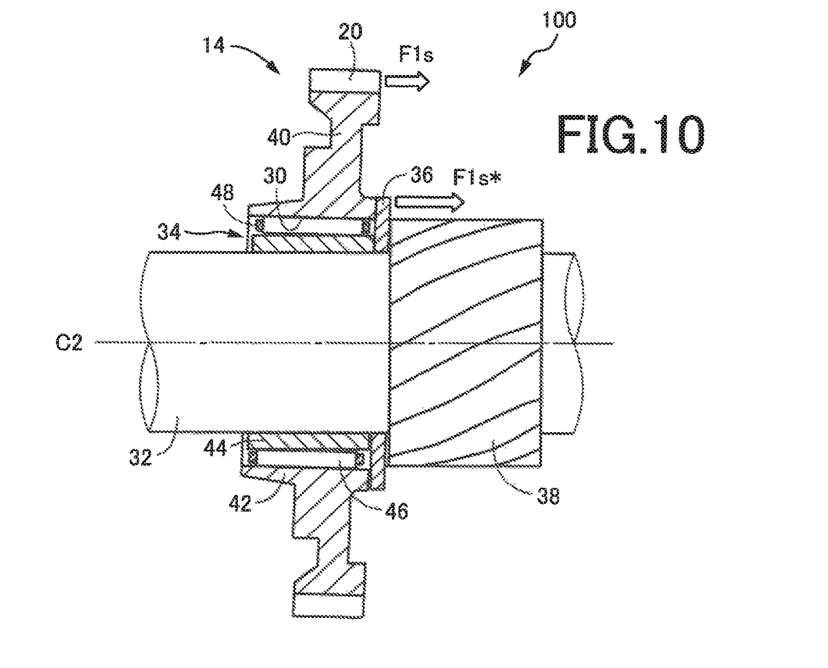
FIG. 10 is an axial cross sectional view corresponding to that of FIG. 9, for explaining application of a boosted axial component F1s of a load of meshing of the second helical gear with a first helical gear, to a thrust washer.

Namely, the meshing interference, which involves abutting contacts of the meshing teeth 20 and 22 of the second and third helical gears 14 and 16, causes an increase of resistance to the rotary motions of the helical gears 14 and 16 due to their sliding resistance and mutual sticking, and consequent considerable deterioration of the power transmitting efficiency of the helical gear device 10. Further, the meshing interference causes reduction of the meshing reaction force F2, and consequent uneven load application to the second helical gear 14 due to an axial component of the meshing load F1 with respect to the first helical gear 12, giving rise to deterioration of the durability of the helical gear device 10. FIGS. 9 and 10 show a conventional helical gear device 100 wherein the radial clearance d1 between the second helical gear 14 and the third helical gear 16 is larger than the radial gap d2 of the backlash 50. In this helical gear device 100, the meshing reaction force F2 is substantially zeroed as a result of the meshing interference between the second and third helical gears 14 and 16, so that the meshing load F1 acts on the tooth meshing portion E1 between the first and second helical gears 12 and 14, at a position of the meshing interference serving as a fulcrum, whereby an axial component F1s of the meshing load F1 is boosted according to a difference of the diametric dimension of the thrust washer 36 disposed axially adjacent to the second helical gear 14, with respect to the diametric dimension of the second helical gear 14, giving rise to a risk of application of an excessively large thrust load F1s* to the thrust washer 36, and consequent early wearing and damaging of the thrust washer 36. In this respect, it is particularly noted that the thrust washer 36 has a risk of deformation due to the excessively large thrust load F1s*, since the cylindrical portion 42 and the thrust washer 36 have the outside diameters larger than the outside diameter of the fourth helical gear 38, that is, extend radially outwardly of the fourth helical gear 38, while the cylindrical portion 42 has the inside diameter almost equal to the outside diameter of the fourth helical gear 38.

Figure 7:
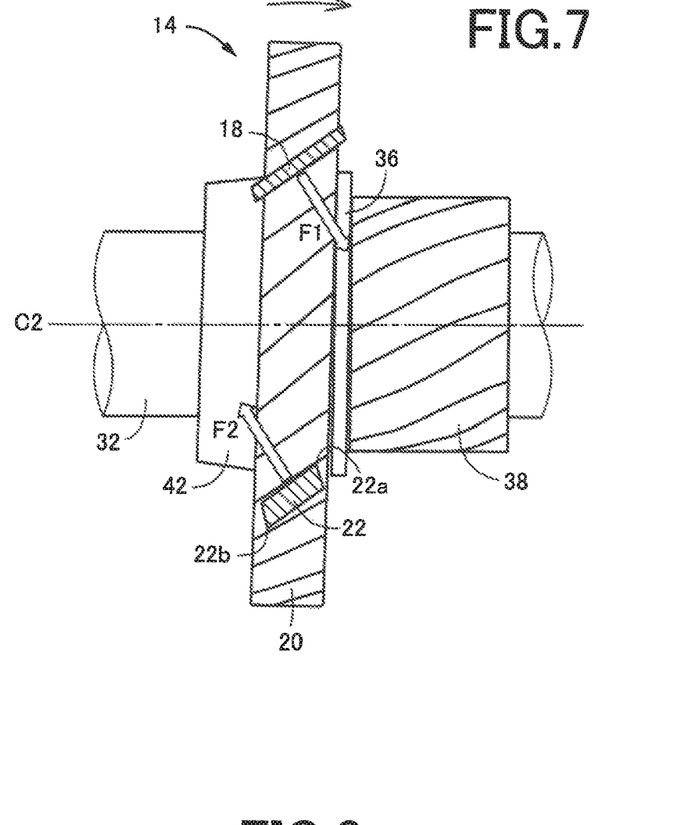
FIG. 7 is a side elevational view corresponding to that of FIG. 2, showing the second helical gear inclined with respect to a support shaft due to a radial play of the second helical gear.

It is further noted that the second helical gear 14 has a risk of inclination with respect to the second axis C2, by being rotated in a direction as indicated by an arrow-headed line D in FIG. 7, due to a moment caused by the meshing load F1 and the meshing reaction force F2, within a range of the radial clearance of the rolling-contact hearing 34. The inclination of the second helical gear 14 causes inclination of the meshing teeth 22 (or meshing grooves) of the third helical gear 16 with respect to meshing grooves (or the meshing teeth 20) of the second helical gear 14, leading to easy generation of the meshing interference with the backlash 50 being zeroed. In the present embodiment wherein the third helical gear 16 has a smaller tooth width than the second helical gear 14, opposite edges 22a and 22b of the meshing teeth 22 of the third helical gear 16 are relatively likely to stick to tooth surfaces of the meshing teeth 20 of the second helical gear 14. Where the second helical gear 14 has a smaller tooth width than the third helical gear 16, opposite edges of the Meshing teeth 20 of the second helical gear 14 are relatively likely to stick to tooth surfaces of the meshing teeth 22 of the third helical gear 16, In the conventional helical gear device 100 of FIG. 9, generation of the meshing interference between the second and third helical gears 14 and 16 in an inclined state of the second helical gear 14 prevents radial escaping of the second helical gear 14 owing to sticking of its edges 22a and 22b to the tooth surfaces of the meshing teeth 20, resulting in more stable application of the excessively large thrust load F1s* to the thrust washer 36. According to the present embodiment, the radial clearance d1 is set so as to be zeroed as a result of the relative movement of the second and third helical gears 14 and 16 toward each other, and so as to prevent the generation of the meshing interference with the backlash 50 being zeroed, even in the event of inclination of the second helical gear 14 with respect to the second axis C2 due to the radial clearance of the rolling-contact bearing 34, as indicated in FIG. 7. Thus, the present embodiment is configured to adequately prevent the meshing interference, irrespective of the concentric misalignment and inclination of the second helical gear 14.

As described above, the helical gear device 10 according to the present embodiment is configured such that the radial clearance d1 between the second and third helical gears 14 and 16 in their reference meshing state is set to be smaller than the radial gap d2 of the backlash 50 in the reference meshing state, permitting prevention of the meshing interference between the second and third helical gears 14 and 16 with the backlash 50 being zeroed as a result of zeroing of the radial clearance d1, irrespective of the concentric misalignment of the second helical gear 14 due to the radial play CL between the second helical gear 14 and the support shaft 32 (due to the radial clearance of the rolling-contact bearing 34). Thus, the present embodiment permits reduction of the backlash 50 while preventing the meshing interference, and reduction of the risk of deterioration of the power transmitting efficiency of the helical gear device 10 due to the meshing interference, and the risk of deterioration of the durability of the helical gear device 10 due to wearing of its parts with uneven load application to the second helical gear 14 due to the axial component F1s of the load F1 of meshing with the first helical gear 12. Namely, in the conventional helical gear device 100 of FIGS. 9 and 10 wherein d1>d2, the meshing interference between the second and third helical gears 14 and 16 causes the axial component F1s of the meshing load F1 to be boosted according to the difference of the diametric dimension of the thrust washer 36 disposed axially adjacent to the second helical gear 14, with respect to the diametric dimension of the second helical gear 14, so that the excessively large thrust load F1s* is applied to the thrust washer 36. In the helical gear device 10 according to the present embodiment, however, the radial clearance d1 is smaller than the radial gap d2 of the backlash 50, to prevent the meshing interference between the second and third helical gears 14 and 16 and to adequately reduce the risk of damaging and wearing of the helical gear device 10, even though there would be a risk of damaging and early wearing of the thrust washer 36 due to the excessively large thrust load F1s* since the outside diameter of the cylindrical portion 42 of the second helical gear 14 is larger than the outside diameter of the fourth helical gear 38 while the inside diameter of the cylindrical portion 42 is almost equal to the outside diameter of the fourth helical gear 38.

The present invention is further configured such that the radial clearance d1 is set to prevent the generation of the meshing interference between the second and third helical gears 14 and 16, even in the event of zeroing of the radial clearance d1 and inclination of the second helical gear 14 due to the radial clearance of the rolling-contact bearing 34, so that the meshing interference of the second helical gear 14 with respect to the third helical gear 16 is adequately prevented to reduce the risk of deterioration of the power transmitting efficiency and durability of the helical gear device 10, even in the event of not only concentric misalignment of the second helical gear 14 but also its inclination with respect to the second axis C2.

The present invention is also configured such that the first helical gear 12, the second helical gear 14 and the third helical gear 16 are external helical gears, and the first, second and third axes C1, C2 and C3 are positioned relative to each other such that the smaller-side angle defined by the first centerline Lc1 connecting the first and second axes C1 and C2 and the second centerline Lc2 connecting the second and third axes C2 and C3, as seen in the front elevational view of FIG. 1, namely, in the direction of the first, second and third axes C1, C2 and C3, is within the range between 60° and 150°. The second centerline Lc2 on which the third axis C3 is positioned is located away from the first centerline Lc1 by the smaller-side angle on the downstream side of rotation of the second helical gear 14. Accordingly, the meshing load F1 applied from the first helical gear 12 to the second helical gear 14 and the meshing reaction force F2 applied from the third helical gear 16 to the second helical gear 14 cause the second helical gear 14 to receive the concentric misalignment force Fa which has a component causing the second helical gear 14 to move toward the third helical gear 16. Although the concentric misalignment force Fa acts to cause a movement of the second helical gear 14 toward the third helical gear 16, and consequent concentric misalignment of the second helical gear 14, the radial clearance d1 is zeroed to prevent the meshing interference between the second and third helical gears 14 and 16, and reduce the risk of deterioration of the power transmitting efficiency and durability of the helical gear device 10, even when the movement is caused.

Figure 8:
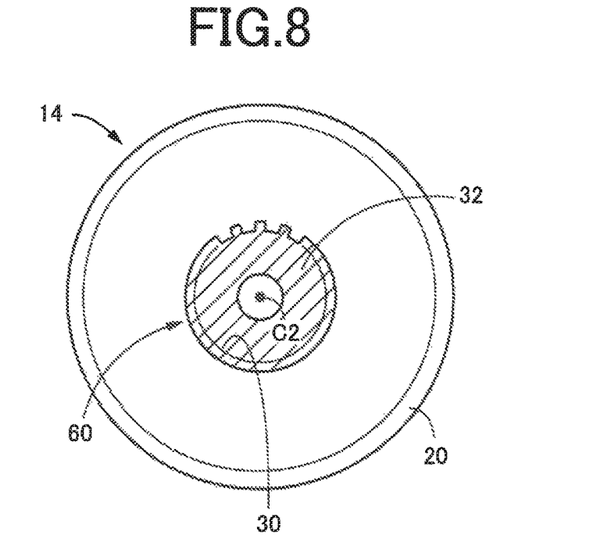
FIG. 8 is a front elevational view showing the second helical gear splined to the support shaft.

In the illustrated embodiment, the second helical gear 14 is supported through the rolling-contact bearing 34 by the support shaft 32 such that the second helical gear 14 is rotatable about the second axis C2. However, the second helical gear 14 may be splined to the support shaft 32 through a spline fitting portion 60, as shown in FIG. 8, such that the second helical gear 14 is rotated about the second axis C2 together with the support shaft 32. That is, the principle of the present invention is equally applicable to a helical gear device wherein the second helical gear 14 is connected to the support shaft 32 through the spline fitting portion 60, such that a radial clearance is formed between the second helical gear 14 and the support shaft 32.

While the preferred embodiment of this invention has been described above by reference to the drawings, it is to be understood that invention may be embodied with various changes and improvements which may occur to those skilled in the art.

NOMENCLATURE OF ELEMENTS

10: Helical gear device
12: First helical gear
14: Second helical gear
16: Third helical gear
30: Center bore
32: Support shaft
34: Rolling-contact bearing
50: Backlash
C1: First axis
C2: Second axis
C3: Third axis
Lc1: First centerline
Lc2: Second centerline
P2: Pitch circle of second helical gear
P3: Pitch circle of third helical gear
d1: Radial clearance
d2: Radial gap of backlash

What is claimed is:

1. A helical gear device comprising:
    a first helical gear disposed rotatably about a first axis;
    a third helical gear disposed rotatably about a third axis parallel to the first axis;
    a second helical gear meshing with the first helical gear and the third helical gear so that a rotary motion is transmitted from the first helical gear to the third helical gear through the second helical gear, the second helical gear having a center bore;
    a support shaft disposed coaxially with a second axis parallel to the first axis, and extending through the center bore with a predetermined amount of radial play between the support shaft and the second helical gear, so as to support the second helical gear rotatably about the second axis; and
    the second helical gear and the third helical gear having a predetermined radial clearance in their reference meshing state in which a pitch circle of the second helical gear and a pitch circle of the third helical gear contact each other, the radial clearance being smaller than a radial gap of a backlash between the second and third helical gears in the reference meshing state.

2. The helical gear device according to claim 1, further comprising a rolling-contact bearing disposed between the support shaft and the center bore, and wherein the second helical gear is supported by the support shaft through the bearing, such that the second helical gear is rotatable about the second axis, with the radial play between the second helical gear and the support shaft.

3. The helical gear device according to claim 1, wherein the radial clearance is set so as to prevent generation of a meshing interference between the second and third helical gears with zeroing of a backlash therebetween, even in the event of zeroing of the radial clearance as a result of a relative movement of the second and third helical gears toward each other, and inclination of the second helical gear with respect to the second axis due to the radial play between the second helical gear and the support shaft.

4. The helical gear device according to claim 2, wherein the radial clearance is set so as to prevent generation of a meshing interference between the second and third helical gears with zeroing of a backlash therebetween, even in the event of zeroing of the radial clearance as a result of a relative movement of the second and third helical gears toward each other, and inclination of the second helical gear with respect to the second axis due to the radial play between the second helical gear and the support shaft.

5. The helical gear device according to claim 1, wherein the first helical gear, the second helical gear and the third helical gear are external helical gears,
    and wherein the first, second and third axes are positioned relative to each other such that a smaller-side angle defined by a first centerline connecting the first and second axes and a second centerline connecting the second and third axes, as seen in a direction of the first, second and third axes, is within a range between 60° and 150°, and the second centerline on which the third axis is positioned is located away from the first centerline by the smaller-side angle on a downstream side of a rotation of the second helical gear.

* * * * *